United States Patent [19]

Hosotani

[11] Patent Number: 4,792,008
[45] Date of Patent: Dec. 20, 1988

[54] FULL HYDRAULIC POWER STEERING SYSTEM

[75] Inventor: Takashi Hosotani, Kawasaki, Japan

[73] Assignee: Nissan Motor Co., Ltd., Yokohama, Japan

[21] Appl. No.: 35,767

[22] Filed: Apr. 8, 1987

[30] Foreign Application Priority Data

Apr. 10, 1986 [JP] Japan .................. 61-82835

[51] Int. Cl.$^4$ .......................... B62D 3/14; B62D 5/06
[52] U.S. Cl. ................................. 180/142
[58] Field of Search ............... 180/142, 141, 143, 132, 180/79.1; 364/424

[56] References Cited

U.S. PATENT DOCUMENTS

| 4,109,748 | 8/1978 | Evans ........................ 180/141 |
| 4,453,615 | 6/1984 | Kanazawa et al. ............ 180/142 |
| 4,473,128 | 9/1984 | Nakayama et al. ........... 180/142 |
| 4,669,568 | 6/1987 | Kervagoret .................. 180/142 |
| 4,672,885 | 6/1987 | Kervagoret ............... 180/142 X |
| 4,691,796 | 9/1987 | Tanooka et al. ............ 180/142 |
| 4,703,819 | 11/1988 | Hosotani .................... 180/132 |

FOREIGN PATENT DOCUMENTS

| 2836926 | 3/1980 | Fed. Rep. of Germany ...... 180/143 |
| 57-99468 | 6/1982 | Japan ............................ 180/142 |
| 60-261779 | 12/1985 | Japan . |
| 2173458 | 10/1986 | United Kingdom . |

Primary Examiner—David M. Mitchell
Assistant Examiner—Charles R. Watts
Attorney, Agent, or Firm—Foley & Lardner, Schwartz, Jeffery, Schwaab, Mack, Blumenthal & Evans

[57] ABSTRACT

A full hydraulic power steering system for a forklift truck or the like is disclosed which employs a hydraulically operated cylinder for turning a steerable wheel of the vehicle with increased power in response to turning of a steering wheel and control means for making a position compensation of the steering wheel in accordance with a change in the relationship between the directional position assumed by the steering wheel and that assumed by the steerable wheel. When the turning speed of the steering wheel is relatively low, the position compensation of the steering wheel is not carried out irrespective of degree of the change in the relationship.

8 Claims, 4 Drawing Sheets

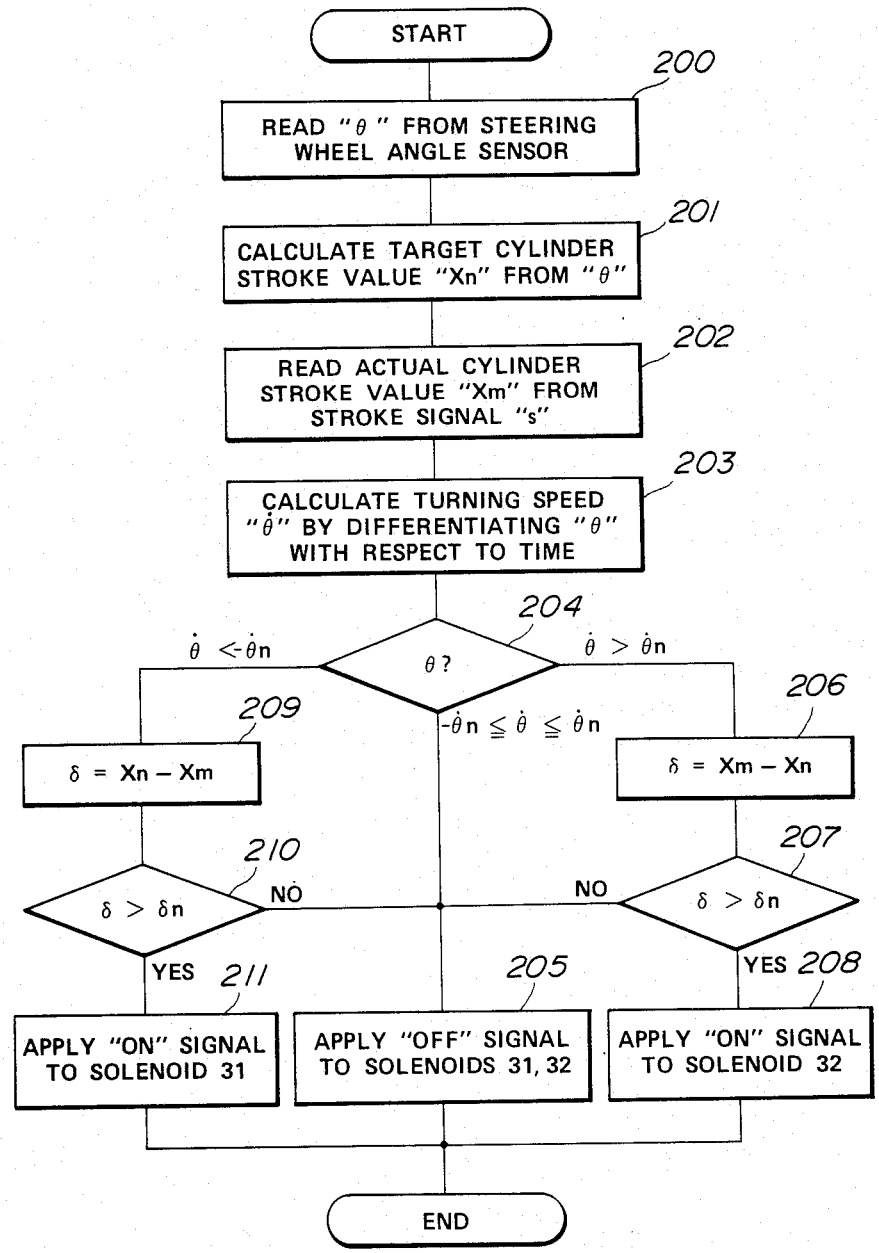

FULL HYDRAULIC POWER STEERING SYSTEM

BACKGROUND OF THE INVENTION

1. Field of the Invention

The present invention relates in general to a steering system of a motor vehicle, and more particularly to a full hydraulic power steering system for use in a forklift truck or the like, which does not require a steering gear nor a mechanical linkage

2. Description of the Prior Art

Japanese Patent First Provisional Publication No. 60-261779 shows one conventional full hydraulic power steering system which is practically applied to a forklift truck. In this system, a hydraulically operated cylinder is used for turning a steered rear wheel of the vehicle with increased power in response to turning of a steering wheel, and a computer-installed control unit is employed for compensating the position of the steering wheel under steering operation of the vehicle in accordance with a change in the relationship between the directional position assumed by the steering wheel and that assumed by the steered rear wheel. That is, the control unit calculates a stroke difference "δ" between an actual cylinder stroke value "Xm" and a target cylinder stroke value "Xn", and when the stroke difference "δ" exceeds a predetermined value "δn", the control unit opens a fluid drain line through which a part of the fluid in the cylinder operating line is drained into a fluid drain tank. With this, the steering wheel becomes idled but temporally thereby carrying out position compensation or correction of the steering wheel automatically.

However, in this conventional system, the position compensation of the steering wheel is carried out irrespective of the turning speed of the steering wheel. Thus, even when the steering wheel is slowly turned by an operator, the idling opration of the steering wheel takes place upon the stroke difference "δ" exceeding the predetermined value "δn". This induces however such a drawback that under slow turning of the steering wheel, the travelling direction of the vehicle will not change even when the steering wheel is being turned. This phenomenon makes the operator uncomfortable and uneasy.

SUMMARY OF THE INVENTION

It is therefore an essential object of the present invention to provide an improved full hydraulic power steering system which is free of the above-mentioned drawback.

It is an object of the present invention to provide a full hydraulic power steering system in which when the turning speed of the steering wheel is relatively low, the position compensation of the steering wheel is not carried out irrespective of degree of the stroke difference "δ" between the actual cylinder stroke value "Xm" and the target cylinder stroke value "Xn".

According to the present invention, there is provided a full hydraulic power steering system for a vehicle having a steerable wheel, which comprises a hydraulic actuator having a stationary part fixed to the vehicle and a movable part movable relative to the stationary part, the movable part being operatively connected to the steered wheel, a steering wheel mounted on the vehicle, a steering unit operated by the steering wheel, hydraulic fluid line means operatively connecting the steering unit and the hydraulic actuator, drain line means connected to a portion of the hydraulic fluid line means for conveying a part of the fluid in the hydraulic line means into a drain tank, valve means disposed in the drain line means for selectively opening and closing the drain line means, a first sensor sensing a steering wheel angle assumed by the steering wheel, a second sensor sensing an actual value in displacement of the movable part of the hydraulic actuator relative to the stationary part of the same, and control means for controlling the valve means in accordance with informations issued from the first and second sensors in such a manner that when a turning speed of the steering wheel is not higher than a predetermined low level, the valve means keeps the drain line means closed.

BRIEF DESCRIPTION OF THE DRAWINGS

FIG. 4 is a flowchart showing a sequence of operations carried out in a control unit employed in the present invention.

DETAILED DESCRIPTION OF THE INVENTION

Figure 1:
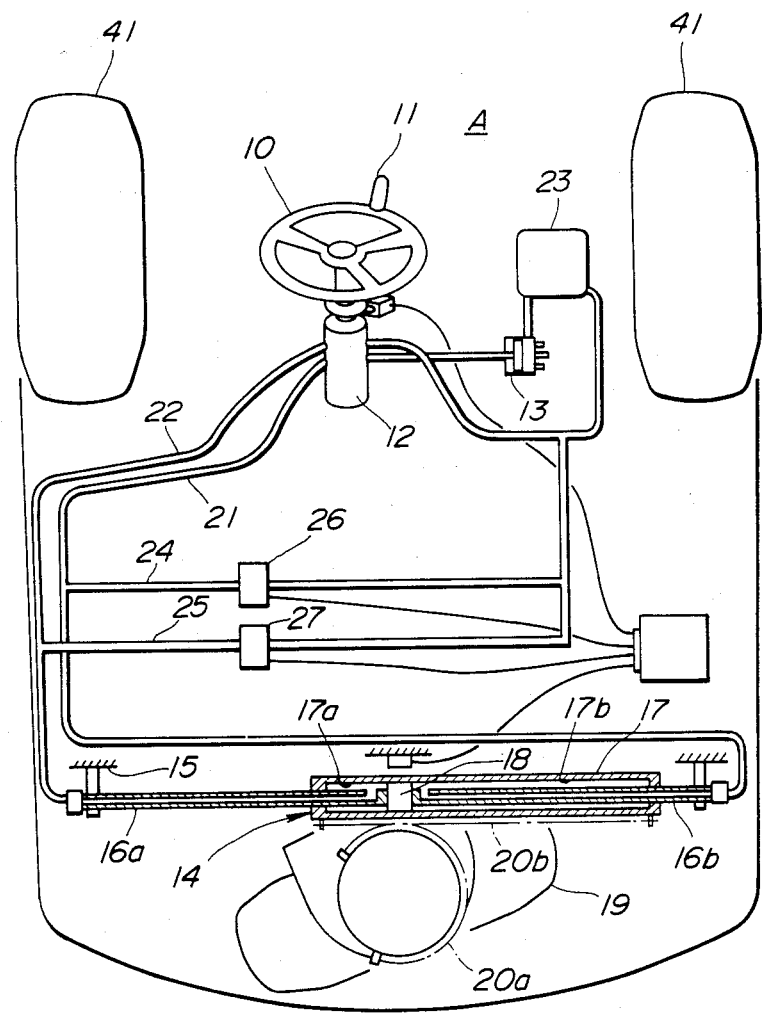
FIG. 1 is a diagram of a three-wheel forklift truck installed with a full hydraulic power steering system of the invention.
Figure 2:
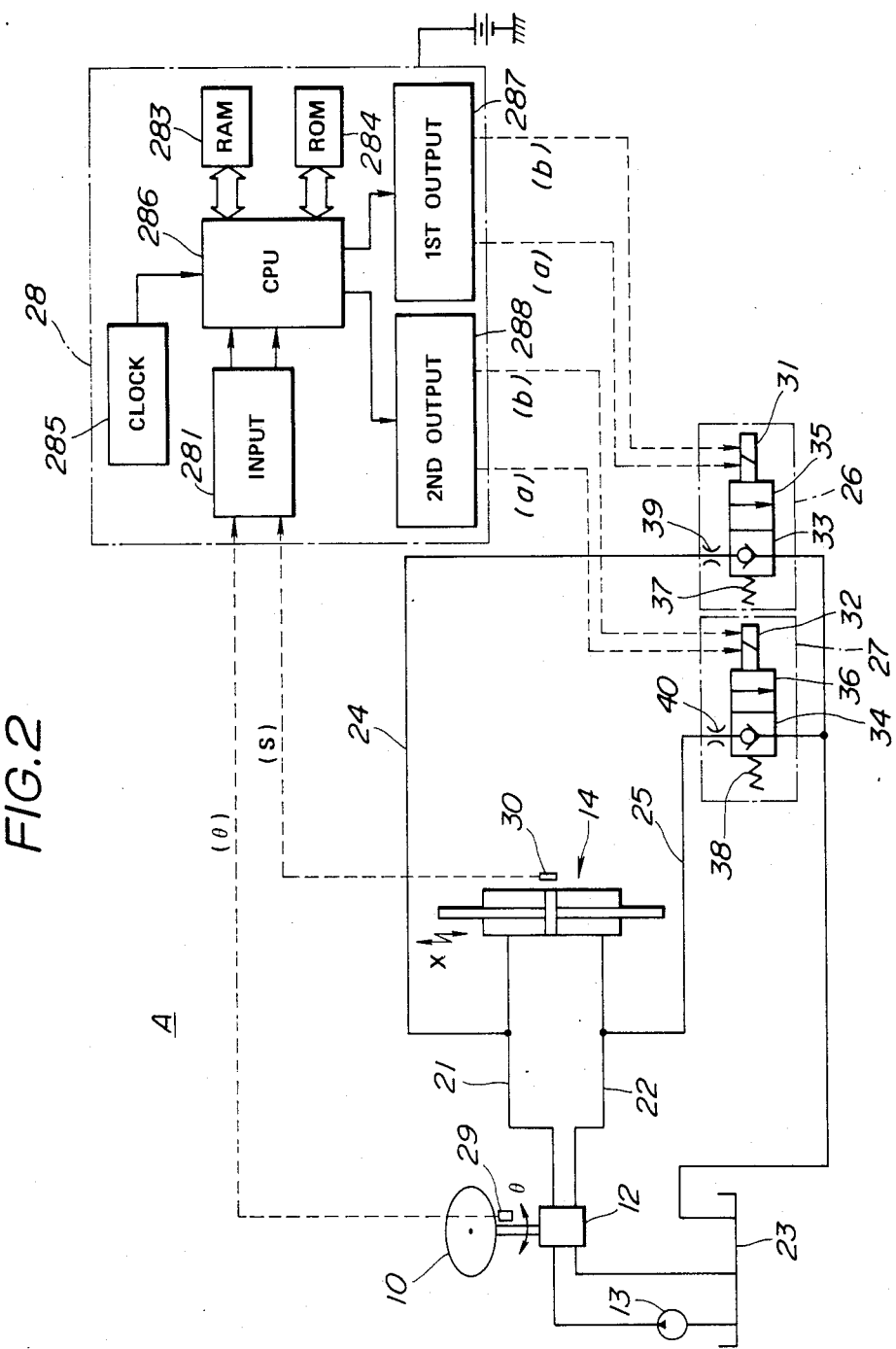
FIG. 2 is a diagram showing an essential part of the full hydraulic power steering system of the present invention.

Referring to the accompanying drawings, particularly FIGS. 1 and 2, there is shown a full hydraulic power steering system of the invention which is practically installed in a three-wheel forklift truck.

The forklift truck comprises a body 15, a pair of unsteerable front wheels 41 and 41 and a steerable rear wheel 19. The full hydraulic power steering system as denoted by reference A comprises a steering wheel 10 with a spoke 11, and a steering unit 12 which is directly controlled by the steering wheel 10. The steering unit 12 has a control valve (not shown) which switches a fluid way in response to a steering operation of the steering wheel 10, and a metering pump (not shown) which regulates a pressurized fluid from a steering pump 13 in a manner to supply a steering cylinder 14 with the pressurized fluid the amount of which is in proportion to the steering wheel angle, viz., an angle through which the steering wheel 10 is turned.

The steering cylinder 14 serves as a hydraulic actuator for actuating the steerable rear wheel 19, which comprises a pair of aligned hollow rods 16a and 16b each having an outward end fixed to the body 15. The rods 16a and 16b extend into a cylinder 17 from the axial ends of the same and have their inward ends fixed to a piston 18 slidably disposed in a bore of the cylinder 17. By the piston 18, the bore is divided into two work chambers which are denoted by reference numerals 17a and 17b.

The steerable rear wheel 19 is connected to the cylinder 17 through a known steering chain drive (20a, 20b), so that an axial movement of the cylinder 17 along the rods 16a and 16b induces a steering movement of the wheel 19.

Two fluid lines 21 and 22 extend from the steering unit 12 and are respectively connectd to the outward open ends of the rods 16a and 16b to communicate with the respective work chambers 17a and 17b of the cylinder 17. During the steering operation, one of the fluid lines 21 and 22 serves as a fluid supply line which conveys the pressurized fluid from the steering pump 13 to one corresponding work chamber 17a or 17b, while, the other fluid line serves as a fluid return line which conveys the fluid from the other work chamber 17b or 17a to a fluid drain tank 23.

Two drain lines 24 and 25 extend respectively from the fluid lines 21 and 22 and are connected to the fluid drain tank 23 through a common fluid line (no numeral) to which a return line from the steering unit 12 is connected. Electromagnetic valves 26 and 27 are respectively connected to the drain lines 24 and 25. As will be described hereinafter, during the steering operation, a part of the fluid in the fluid line 21 or 22 is discharged into the fluid tank drain 23 through the drain line 24 or 25 having the valve 26 or 27 opened, so that an angular position of the steering wheel 10 is compensated or corrected. That is, the drain lines 24 and 25 and the electromagnetic valves 26 and 27 constitute a drain fluid control means.

As is seen from FIG. 2, each of the valves 26 and 27 comprises a check valve section 33 or 34, a drain port section 35 or 36, a solenoid section 31 or 32, a spring 37 or 38, and an orifice 39 or 40. The orifice 39 or 40 is disposed in the drain line 24 or 25 between the fluid line 21 or 22 and the check valve section 33 or 34, as shown.

Operation of the electromagnetic valves 26 and 27 is controlled by a control unit 28 in response to a signal "$\theta$" (theta) issued from a steering wheel angle sensor 29 and another signal "s" issued from a cylinder position sensor 30. The steering wheel angle sensor 29 detects a steering wheel angle assumed by the steering wheel 10 and generates an angle signal "$\theta$" indicative of the steering wheel angle detected, while, the cylinder position sensor 30 detects a stroke of the cylinder 17 and generates a stroke signal "s" indicative of the stroke detected. In response to the angle signal "$\theta$" and the stroke signal "s" received, the control unit 28 outputs, to the solenoids 31 and 32 of the electromagnetic valves 26 and 27, ON signal "a" instructing the valves to assume the drain port mode or OFF signal "b" instructing the valves to assume the check valve mode. In the drain port mode, a part of the fluid in the fluid line 21 or 22 is drained into the fluid drain tank 23 through the drain line 24 or 25, while, in the check valve mode, this fluid draining is not carried out.

The control unit 28 comprises an input circuit 281, a RAM 283, a ROM 284, a clock 285, a CPU 286, a first output circuit 287 and a second output circuit 288. The input circuit 281 includes a counter which counts the number of pulses of the angle signal "$\theta$" supplied thereto in terms of a pulse train and converts the result into a digital signal that is suitable for processing in the CPU 286. The input circuit 281 further includes a A/D converter which converts the stroke signal "s" supplied thereto in terms of an analogue current signal generated by the cylinder position sensor 30 employing a variable resistor into a digital signal that is suitable for processing in the CPU 286.

As will be clearly understood as the description proceeds, the control unit 28 operates so that when, with the turning speed "$\dot{\theta}$" ($=d\theta/dt$) of the steering wheel 10 being relatively high (viz., $\dot{\theta} < -\dot{\theta}n$, $\dot{\theta} > \dot{\theta}n$, wherein $\dot{\theta}n$ is a predetermined value representing that the turning speed of the steering wheel 10 is relatively low), a stroke difference "$\delta$" between an actual cylinder stroke value "Xm" directly given from the cylinder stroke "X" and a target cylinder stroke value "Xn" given from the turning angle "$\theta$" of the steering wheel 10 exceeds a predetermined value "$\delta n$", ON signals "a" are issued from the first and second output circuits 287 and 288 of the control unit 28, while, when, with the turning speed "$\dot{\theta}$" of the steering wheel 10 being relatively high, the stroke difference "$\delta$" becomes smaller than the predetermined value "$\delta n$", OFF signals "b" are issued from the output circuits 287 and 288 of the control unit 28. When however the turning speed "$\dot{\theta}$" of the steering wheel 10 is lower than the predetermined value "$\dot{\theta}n$" (viz., $-\dot{\theta}n \leq \dot{\theta} \leq \dot{\theta}n$), OFF signals "b" are issued irrespective of the value of the stroke difference "$\delta$".

Figure 3:
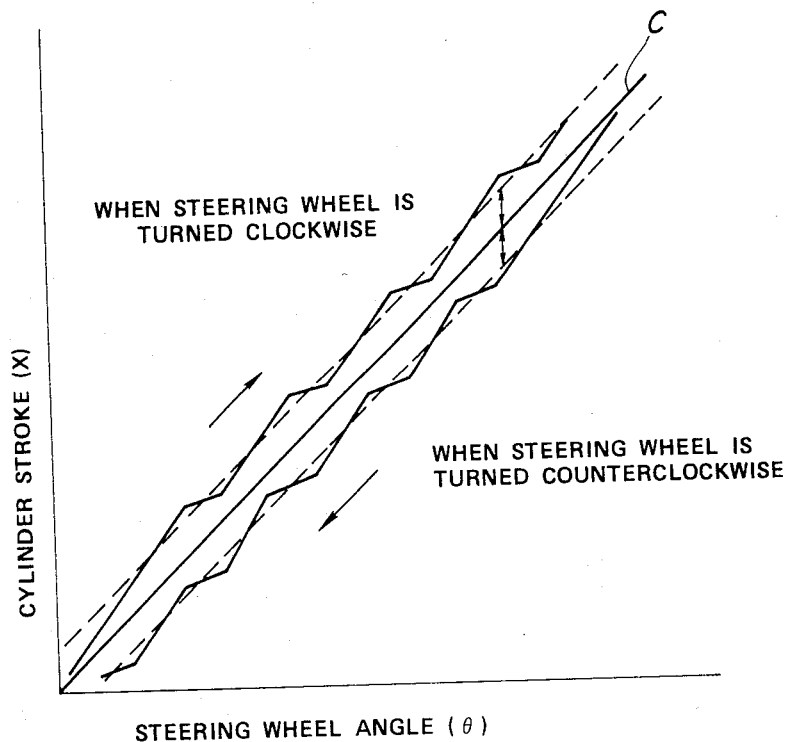
FIG. 3 is a graph showing characteristics of control achieved by the present invention.

For achieving this, the RAM 283 stores temporally the angle signal "$\theta$" and the stroke signal "s", respectively. The ROM 284 stores a table establishing a relationship between a value in cylinder stroke "X" and a value in steering angle "$\theta$", that is, the relationship depicted by the characteristic line C in the graph of FIG. 3. The ROM 284 further stores the calculation formulas for the stroke difference "$\delta$" and the target cylinder stroke value "Xn", and the predetermined values "$\delta n$" and "$\dot{\theta}n$".

In the following, operation will be described with reference to a flow chart of FIG. 4 which shows a series of operations executed by the control unit 28.

(A). In case wherein the turning speed "$\dot{\theta}$" of the steering wheel 10 is relatively low, that is, not higher than the predetermined value "$\dot{\theta}n$":

When the steering wheel 10 is kept unturned or turned clockwise or counterclockwise at a slow speed (viz., $-\dot{\theta}n \leq \dot{\theta} \leq \dot{\theta}n$), operation flows through step 200, step 201, step 202, step 203, step 204 and step 205 in this order. The step 205 instructs the first and second output circuits 287 and 288 to issue "OFF" signals "b", so that the electromagnetic valves 26 and 27 assume the check valve mode. Thus, under this condition, the drain fluid control means does not carry out the position compensation for the steering wheel 10.

That is, at step 200, the turning angle "$\theta$" of the steering wheel 10 is read from the turning angle signal issued by the steering angle sensor 29. A target cylinder stroke value "Xn" is, at step 201, calculated by using the turning angle "$\theta$" from step 200. At step 202, an actual cylinder stroke value "Xm" is read from the stroke signal "s" issued from the cylinder position sensor 30, and at step 203, the turning angle "$\theta$" is differentiated with respect to time to obtain a turning speed "$\dot{\theta}$" of the steering wheel 10. At step 204, a comparison is made among the turning speed "$\dot{\theta}$" of the steering wheel 10, the predetermined value "$\dot{\theta}n$" and a negative value (viz., "$-\dot{\theta}n$") of the predetermined value "$\dot{\theta}n$" in order to judge whether the steering wheel turning is made clockwise or counter clockwise. That is, when the turning speed "$\dot{\theta}$" of the steering wheel 10 is positive (or negative), the step 204 judges that the steering wheel turning is made clockwise (or counterclockwise).

(B). In case wherein the steering wheel 10 is turned clockwise quickly, that is, at the turning speed "$\dot{\theta}$" higher than the predetermined value "$\dot{\theta}n$":

When the steering wheel 10 is turned quickly in the clockwise direction (viz., $\dot{\theta} \leq \dot{\theta}n$), operation flows through step 200, step 201, step 202, step 203, step 204, step 206, step 207 and either one of steps 208 and 205 in this order.

That is, the step 204 judges that the steering wheel 10 has been turned clockwise from the fact that the turning speed "$\dot{\theta}$" is positive and higher than the predetermined value "$\dot{\theta}n$". At step 206, Xm−Xn is calculated to obtain the stroke difference "δ". Then, at step 207, the stroke difference "δ" is compared with the predetermined value "δn". When the stroke difference "δ" is not larger than the predetermined value "δn" (viz., δ≦δn), the operation is advanced to step 205 for instructing the first and second output circuits 287 and 288 to issue "OFF" signals "b" to cause the electromagnetic valves 26 and 27 to assume the check valve mode. While, when the stroke difference "δ" is larger than the predetermined value "δn" (viz., δ>δn), the operation is advanced to step 208 for instructing the second output circuit 288 to issu ON signal "a" to cause the electromagnetic valve 27 to assume the drain port mode.

Accordingly, when the steering wheel 10 is turned quickly in the clockwise direction, the position of the steering wheel 10 is automatically compensated with the valve 27 repeating the check valve mode and the drain port mode by turns. This position compensation will be understood from the characteristic line $H_R$ in the graph of FIG. 3. (C). In case wherein the steering wheel 10 is turned counterclockwise quickly, that is, at the turning speed "$\dot\theta$" higher than the predetermined value "$\dot\theta n$":

When the steering wheel 10 is turned quickly in the counterclockwise direction (viz., $\dot\theta < -\dot\theta n$), operation flows through step 200, step 201, step 202, step 203, step 204, step 209, step 210 and either one of steps 211 and 205, in this order.

That is, the step 204 judges that the steering wheel 10 has been turned counterclockwise from the fact that the turning speed "$\dot\theta$" is negative and lower than the negative value (viz., $-\dot\theta n$) of the predetermined value $\dot\theta n$. At step 209, Xn−Xm is calculated to obtain the stroke difference "δ". Then, at step 210, the stroke difference "δ" is compared with the predetermined value "δn". When the stroke difference "δ" is not larger than the predetermined value "δn" (viz., δ≦δn), the operation is advanced to step 205 for instructing the first and second output circuits 287 and 288 to issue "OFF" signals "b" to cause the electromagnetic valves 26 and 27 to assume the check valve mode. While, when the stroke difference "δ" is larger than the predetermined value "δn" (viz., δ>δn), the operation is advanced to step 211 for instructing the first output circuit 287 to issue ON signal "a" to cause the electromagnetic valve 26 to assume the drain port mode.

Accordingly, when the steering wheel 10 is turned quickly in the counterclockwise direction, the position of the steering wheel 10 is automatically compensated with the valve 26 repeating the check valve mode and the drain port mode by turns. This position compensation will be understood from the characteristic line $H_L$ in the graph of FIG. 3.

As will be understood from the above description, in the present invention, when the turning speed "$\dot\theta$" of the steering wheel is relatively low, that is, not higher than the predetermined low value "$\dot\theta n$", the position compensation for the steering wheel is not carried out irrespective of degree of the stroke difference "δ" between the actual cylinder stroke value "Xm" and the target cylinder stroke value "Xn". Accordingly, when the steering wheel 10 is turned slowly, the turning of the steering wheel 10 is quickly and reliably transmitted to the steered rear wheel 19 without providing an operator with unpleasant steering feeling.

If desired, the following modifications may be employed in the present invention.

Two predetermined values "δn" and "$δ_L$" are provided for the stroke difference "δ" wherein "δn" is larger than "$δ_L$". That is, when the position compensation for the steering wheel 10 is being carried out with the stroke difference "δ" being larger than the predetermined value "δn", stopping of the compensation is only effected when the stroke difference "δ" becomes smaller than the other predetermined value "$δ_L$".

In place of the cylinder position sensor 30 which detects the stroke of the cylinder 17, a steered wheel position sensor may be used which detects the steering angle assumed by the steerable rear wheel 19.

What is claimed is:

1. A full hydraulic power steering system for a vehicle having a steerable wheel, comprising:
   a hydraulic actuator having a stationary part fixed to the vehicle and a movable part movable relative to said stationary part, said movable part being operatively connected to said wheel;
   a steering wheel mounted on said vehicle;
   a steering unit operated by said steering wheel;
   a hydraulic fluid line operatively connecting said steering unit and said hydraulic actuator;
   drain line means connected to a portion of said hydraulic fluid line for conveying a part of the fluid in the hydraulic line into a drain tank;
   valve means disposed in said drain line means for selectively opening and closing said drain line means;
   first sensor means for sensing a steering wheel angle assumed by said steering wheel and for providing information based thereon;
   second sensor means for sensing an actual value for displacement of said movable part of the hydraulic actuator relative to said stationary part of the same and for providing information based thereon; and
   control means for calculating turning speed of the steering wheel and for controlling said valve means in accordance with the information from said first and second sensors in such a manner that when the turning speed of the steering wheel is not higher than a predetermined low level, said valve means keeps said drain line means closed.

2. A full hydraulic power steering system as claimed in claim 1, in which said valve means comprises an electromagnetic valve which opens said drain line means when electrically energized.

3. A full hydraulic power steering system as claimed in claim 2, in which said first sensor means generates a pulse train indicative of the steering wheel angle, and said second sensor means generates an analogue current signal indicative of an actual displacement of the movable part of the hydraulic actuator relative to the stationary part of the same.

4. A full hydraulic power steering system as claimed in claim 3, in which said control means comprises an input circuit which includes a counter which counts the number of pulses of the pulse train from said first sensor means and converts the result into a digital signal, and an A/D converter which converts the analogue current signal from the second sensor means into a digital signal.

5. A full hydraulic power steering system as claimed in claim 4, in which said control means further comprises first means which calculates the turning speed of the steering wheel by differentiating the steering wheel angle signal applied thereto with respect to time, and second means which calculates a target value in the displacement of said movable part of the hydraulic actuator from the steering wheel angle signal applied thereto.

6. A full hydraulic power steering system as claimed in claim 5, in which said control means further comprises third means which calculates a difference between the actual value in the displacement of the movable part and the target value in the same, and fourth means which causes said valve means to assume its open position when said difference is larger than a predetermined value.

7. A full hydraulic power steering system as claimed in claim 6, in which said control means further comprises a fifth means which makes said third and fourth means inoperative when said turning speed of the steering wheel is not higher than said predetermined low level.

8. A full hydraulic power steering system for a vehicle having a steerable wheel, comprising:
   a hydraulic actuator having a stationary part fixed to the vehicle and a movable part movable relative to said stationary part, said movable part being operatively connected to said wheel;
   a steering wheel mounted on said vehicle;
   a steering unit operated by said steering wheel;
   a hydraulic fluid line operatively connecting said steering unit and said hydraulic actuator;
   drain line means connected to a portion of said hydraulic fluid line for conveying a part of the fluid in the hydraulic line into a drain tank;
   valve means disposed in said drain line means for selective movement between open and closed positions for selectively opening and closing said drain line means;
   first sensor means for sensing a steering wheel angle assumed by said steering wheel and for providing information based thereon;
   second sensor means for sensing an actual value for displacement of said movable part of the hydraulic actuator relative to said stationary part of the same and for providing information based thereon; and
   control means for calculating turning speed of the steering wheel and for controlling said valve means in accordance with the information from said first and second sensors in such a manner that when the turning speed of the steering wheel is not higher than a predetermined low level, said valve means keeps said drain line means closed.

* * * * *